Oct. 22, 1935.   A. C. MAYO   2,017,979
CAMERA
Filed Sept. 12, 1934   2 Sheets—Sheet 1
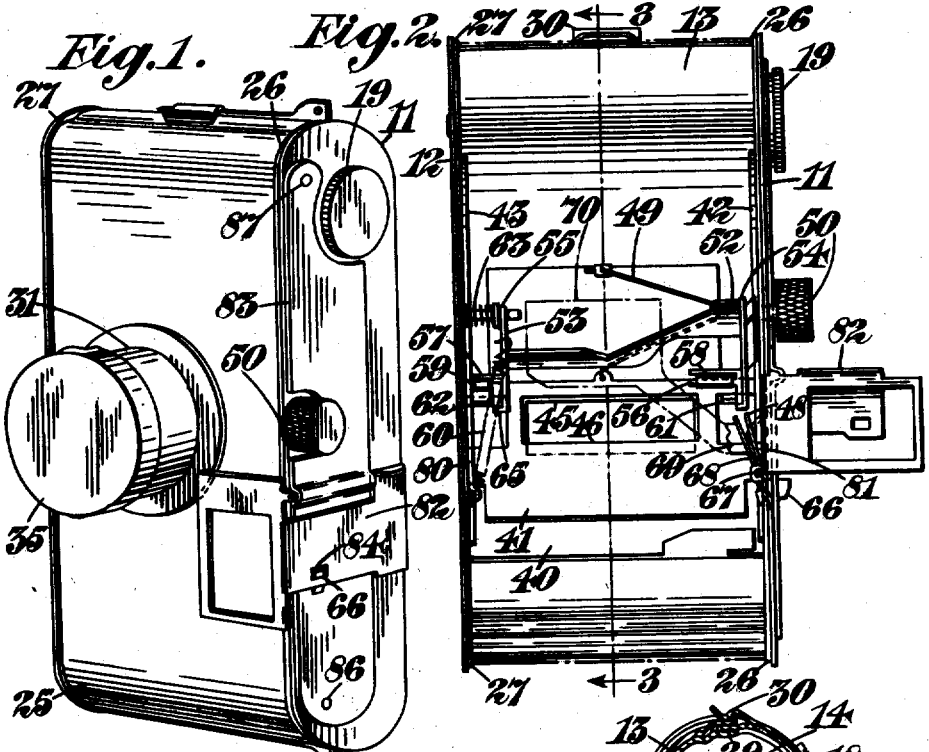
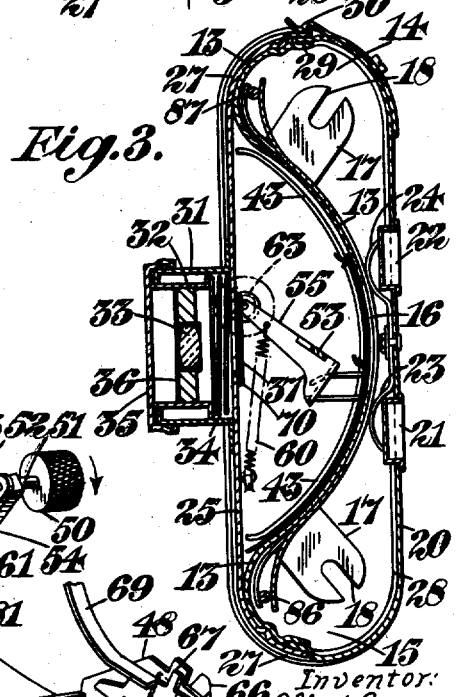
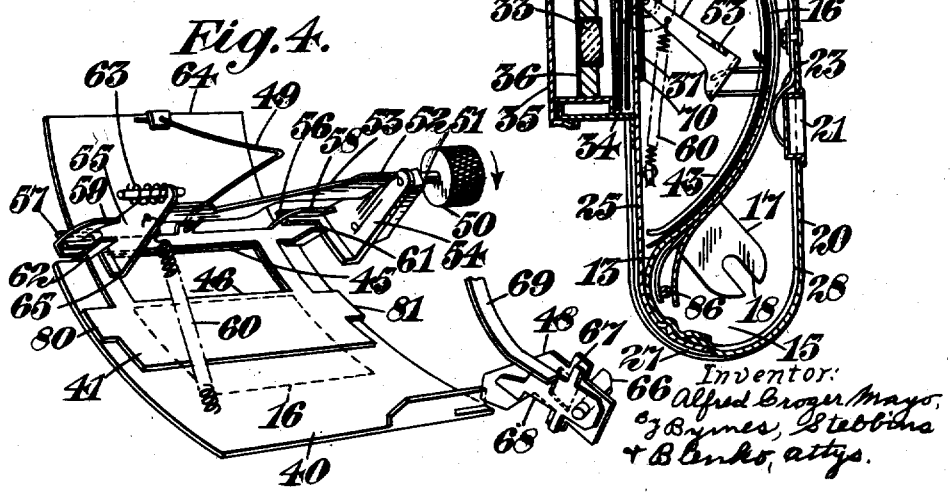

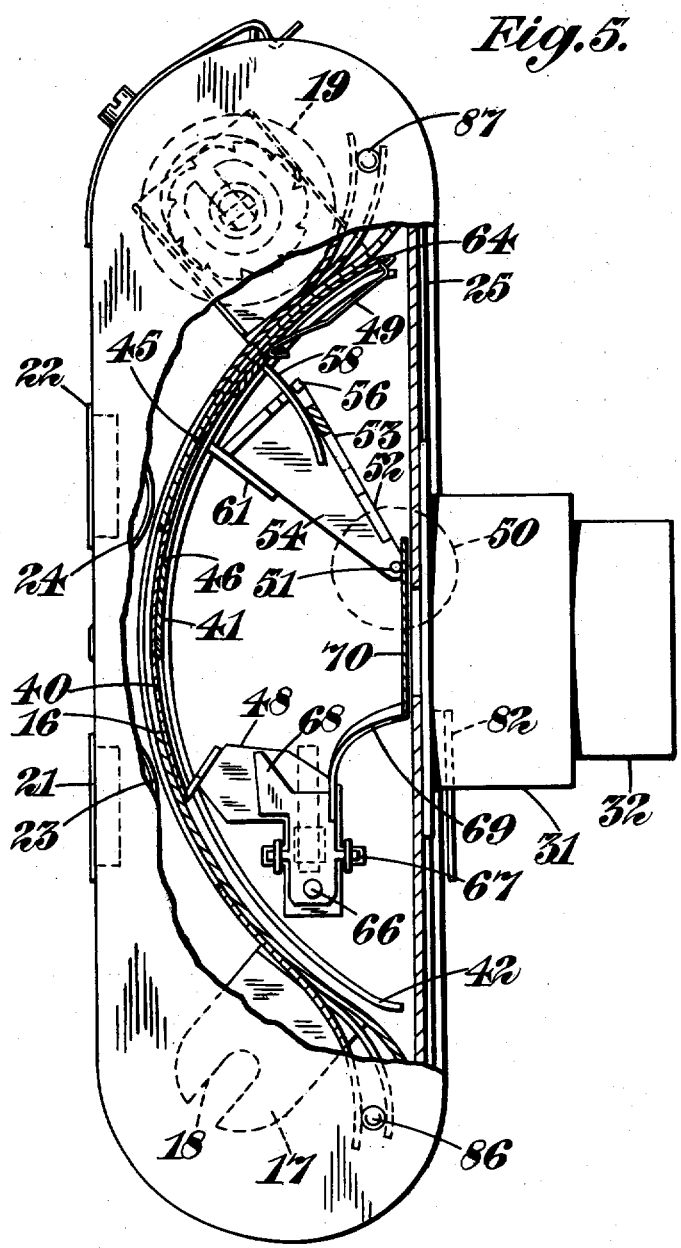

Patented Oct. 22, 1935

2,017,979

UNITED STATES PATENT OFFICE 2,017,979

CAMERA

Alfred Croger Mayo, Richmond, England

Application September 12, 1934, Serial No. 743,775
In Great Britain September 22, 1933

13 Claims. (Cl. 95—31)

This invention comprises improvements in cameras.

It is an object of this invention to provide a camera having a focal plane shutter which is easily set and is constructed entirely of metal or like rigid material; is compact and is adapted to be readily operated in a film camera of small dimensions; and which facilitates the construction of a camera capable of giving rapid exposures with a simple lens of small aperture.

The invention comprises in combination a back-plate with a picture-aperture therein means to hold a light-sensitive surface close against the back of the picture-aperture in the back-plate, a shutter plate with an exposure-aperture therein, mounted to slide on the front of the back-plate, yielding means to urge the shutter-plate across the picture-aperture, setting means to retract the shutter-plate against said yielding means into "set" position at one side of said aperture, a releasable catch to hold said shutter-plate in set position and means associated with said setting means for covering the exposure-aperture in the shutter-plate during movement towards set position but for leaving it uncovered when released.

The means for covering the aperture in the shutter plate may comprise a covering-plate closely overlying the shutter-plate, slidable relatively thereto, provided with an exposure-aperture adapted to coincide with the exposure-aperture in the shutter-plate, yieldingly urged in such a direction that said exposure-apertures coincide, and provided with an abutment for engagement with the setting means so that movement in the setting direction causes the covering-plate to slide over the shutter-plate to close the said apertures during the setting operation.

In the preferred construction the back-plate, a shutter plate and the covering-plate are all curved so as to be concave on the side toward the camera lens as this leads to a compact construction of camera capable of accommodating roll film of the ordinary kind and moreover tends to compensate for the distortion otherwise produced by a simple lens when focussing upon a flat field.

The invention will now be described with reference to a specific embodiment illustrated by way of example in the accompanying drawings in which:—

Figure 1 is a perspective view of the exterior of a camera.

Figure 2 is a front view with the lens and the front-plate of the camera removed to show the shutter.

Figure 3 is a cross-section upon the line 3—3 of Figure 2 looking in the direction of the arrows.

Figure 4 is a perspective detail of the shutter parts, and

Figure 5 is a view to an enlarged scale of the camera with parts broken away and looking in the opposite direction to that of Figure 3.

The camera is built up upon two main side plates 11, 12 which are united together by a curved plate 13 passing around the front of two spool spaces 14, 15 and curved rearwardly between the spool spaces nearly to the back of the camera. The plate 13 constitutes a back plate behind the shutter hereinafter described and has a picture aperture 16 cut in it. A spool-holder 17 is provided with slots 18 to receive the projections usually provided on film spools for vest-pocket cameras and at one end outside the plate 11 there is a winding knob 19. The spool space and the parts just described are covered in at the back by means of a camera-back 20 provided with two number windows 21, 22 so that two pictures can be taken for each number on the spool of film. The sensitive surface of the film in the camera is held close against the back of the picture aperture 16 in the back-plate 13 by means of light springs 23, 24 on the back of the camera. The front of the camera comprises a front-plate 25 which is curved at its ends to fit around the curved end portions of the plate 13 and which is clamped between the side-plates 11, 12. The edges of the plate 25 fit beneath flanges 26, 27 formed around the rim of the side plates 11, 12 and thus the curved ends of the front-plate 25 are firmly fixed between the back plate 13 and the flanges 26, 27. It will be observed that at the bottom of the front-plate the plate 13 is bent a little away from it and the back-plate 20 of the camera is inserted at its bottom edge between the back-plate 13 and the front-plate 25. This makes a light tight joint. The side edges of the back 20 overlie inwardly projecting flanges 28 around the rear edges of the side-plates 11, 12 and at the top the back of the camera fits at 29 between the front 25 and the plate 13, being clipped in place by a spring clip 30. These parts are best shown in Figures 2 and 3.

The front-plate 25 carries a forwardly projecting tubular lens-mounting 31 in which is slidably carried a lens-tube 32, capable of telescoping in the mounting 31. In the lens-tube is a lens 33 and the lens-tube is resiliently pressed forward by a spring 34. It is covered with a cap 35 held on the mounting 31 by means of a bayonet joint. When the cap is in place the lens 33 is pushed inwardly by the cap as shown in Figure 3 but on removal of the cap the lens automatically shoots forward into the position shown in Figure 5 in which position it is focussed for average distances. A diaphragm 36 is provided in front of the lens. The front-plate 25 has a rectangular opening 37 behind the lens of adequate size to ensure illumination of the picture opening 16 in the back-plate 13.

The shutter parts are best seen in Figure 4 and they comprise a curved shutter-plate 40 which fits closely but is freely slidable over the back-plate 13. The shutter-plate has fitting closely over it a covering-plate 41 and the side edges of the plates 40, 41 are overlaid by narrow flanges 42, 43 projecting inwardly from the main side plates 11, 12 of the camera. These flanges may be welded or brazed in place and they are spaced from the back-plate 13 by such a distance as to allow the shutter-plate 40 and covering-plate 41 to be slid beneath the flanges freely and without undue play.

The shutter-plate 40 has a rectangular aperture 45 cut across it corresponding in width to the width of the picture-aperture 16 and in length to the aperture required for the desired maximum length of exposure to be afforded by the shutter. The covering-plate 41 has a similar aperture 46 in it so located that in one position of the covering-plate the apertures 45 and 46 may be made to coincide as shown in Figure 4. Figure 4 shows the shutter in its set position, ready for making an exposure and the aperture 16 in the back-plate is indicated by a dotted line. It will therefore be seen that in this position the exposure apertures 45, 46 are drawn beyond the picture-aperture 16. In this position the shutter-plate 40 is held by a releasable catch 48 hereinafter more fully described. The covering-plate 46 is yieldingly connected to the shutter-plate by means of a hairpin spring 49 hereinafter referred to.

In order to bring the shutter-plate 40 and the covering-plate 41 into the set position as shown in Figure 4 a setting knob 50 is provided carried on a spindle 51 and connected to a setting lever 52. The setting lever 52 comprises a yoke portion 53 which extends across the camera from side to side and two downwardly projecting lever arms 54, 55. The lever arm 54 carries a laterally projecting fork 56 at its lower end and the lever arm 55 carries a similar fork 57. Two ears 58, 59 are bent up from the side edges of the covering-plate 41 so as to enter between the arms of the forks 56, 57. Therefore rotation of the setting knob 50 with the lever 53 will carry the covering-plate 41 with it. The lever 53 is retracted by a shutter spring 60 secured at one end of the side-plate 12 of the camera. The spring 60 not only tends to retract the lever 53 from the set position but also to carry with it the covering-plate 41.

In addition to the above parts the shutter-plate 40 is provided with two bent up ears 61, 62 which lie behind the arms of the forks 56, 57. Furthermore the spindle 51 of the setting knob 50 and with it the lever 53 are movable axially to a slight extent to the left as shown in Figure 4 against the action of a short coil-spring 63, for the purpose of setting the speed of the shutter, as hereinafter described. The releasable-catch 48 is operated by a trigger 66 pivoted at 67 on the side wall 11 of the camera. The trigger 66 is not mounted directly upon the catch 48 but is pivoted about the same axis therewith upon a trigger-plate 68 and the trigger-plate 68 is arranged to overlie the catch-plate 48 so that when the trigger 66 is pressed there will be a slight lost motion and then the catch will be released. The trigger-plate 68 is moreover provided with an arm 69 and bent partly with and just behind the plane of the front 25 of the camera. The arm 69 carries a flag 70 best seen in Figure 5. Thus the first operation of the trigger 66 is to move the flag and the second operation is to release the shutter. The flag 70 is disposed immediately behind the aperture 34 in the front 25 of the camera through which the light from the lens 33 passes. Consequently the flag 70 acts as an additional precaution against light leakage when the shutter is being set.

In the operation of the shutter the setting knob 50 is first rotated in the direction shown by the arrow in Figure 4, the forks 56, 57 of the setting lever 53 thereby carrying the covering-plate 41 forwardly into the position in which the aperture 46 is out of register, beyond the exposure aperture 45 in the shutter-plate 40. After the exposure-aperture 45 has thus been closed the lateral projections 80, 81 on the covering-plate engage the rear faces of the ears 61, 62 on the shutter-plate and the shutter-plate and covering-plate (movement of the knob 50 being continued) move together across the picture-aperture 16 until they have passed it. If a rapid exposure is desired, the knob 50 will now be pressed inwardly so that the face 65 may engage the ear 62 and prevent the covering-plate 41 being retracted by the spring 60 (when the knob 50 is released by the operator) more than a little way, sufficient to afford a narrow slit-like opening through the two apertures 45, 46, which are only partially in register with each other. If a longer exposure is required the knob 50 is not pressed inwardly and the spring 60 will draw the covering-plate 41 back into the position shown in Figure 4. The parts are held from further retraction under the influence of the spring 60 by the catch 48. The shutter is now set and will not be released until the trigger 66 is operated. The camera can be carried in this condition, the cap 35 if in position effectually preventing accidental exposure. As a further safeguard against accidental exposure a view-finder 82 is pivotally secured to the side-plate 11 of the camera by means of a clamping-plate 83, as shown in Figure 1, and when the view-finder is folded down as shown in that figure an aperture 84 in the view-finder plate embraces the trigger 66 and positively prevents it from movement. On erecting the view-finder in the position shown in Figure 2 the trigger 66 is freed from restraint so that the operator can actuate it at his pleasure. All that is necessary therefore to make an exposure, if the view-finder be raised, is to remove the cap 35 and press the trigger 66. This will displace the flag 70 from behind the aperture 34 and thereafter release the catch 48, thus permitting the shutter-plate 40 and the covering-plate 41, still retaining their relative position in which they have been set, to slide across the picture-aperture 16 under the influence of the spring 60.

The side-plates 11, 12 and all the intermediate parts are held together by the aid of only two long screws 86, 87 which pass through the camera from side to side.

It will be observed that the camera described is constructed from a minimum of parts and provides a focal plane shutter which works in the closest possible proximity to the film being exposed, thus leading to maximum efficiency. Owing to the slight curve on which the film is laid a measure of compensation for the aberration of a simple lens is provided, and owing to the efficiency of the shutter very rapid exposures can be taken with a relatively small aperture. With a suitable strength of spring when the camera is held in such a position that the shutter-plate 40 falls during the making of the exposure, speeds of about $$\frac{1}{75\text{th}}$$

and $$\frac{1}{250\text{th}}$$

of a second can be provided, while if the camera is inverted so that the shutter moves upwardly in making the exposure, the speeds can be made longer, say $$\frac{1}{25\text{th}}$$

and $$\frac{1}{75\text{th}}.$$

If the camera be held horizontally, intermediate speeds are obtained of about $$\frac{1}{40\text{th}}$$

and $$\frac{1}{120\text{th}}$$

of a second.

By making the apertures 45, 46 of dimensions similar to those of the picture-aperture 16 and providing an auxiliary catch to hold the shutter-plate 40 temporarily in the position of the parts in which they coincide with the picture-aperture 16 it is possible to arrange for time exposures.

I claim:—

1. In a camera a focal-plane shutter comprising in combination a back-plate with a picture-aperture therein means to hold a light-sensitive surface close against the back of the picture-aperture in the back-plate, a shutter-plate with an exposure-aperture therein, mounted to slide on the front of the back-plate, yielding means to urge the shutter-plate across the picture-aperture, setting means to retract the shutter-plate agains said yielding means into "set" position at one side of said aperture, a releasable-catch to hold said shutter-plate in set position, means for covering the aperture in the shutter-plate comprising a covering-plate closely overlying the shutter-plate, slidable relatively thereto, provided with an exposure-aperture adapted to coincide with the exposure-aperture in the shutter-plate, yieldingly urged in such a direction that said exposure-apertures coincide, and provided with an abutment for engagement with the setting means so that movement in the setting direction causes the covering-plate to slide over the shutter-plate to close the said apertures during the setting operation.

2. In a camera a focal-plane shutter as claimed in claim 1, wherein the back-plate, the shutter-plate and the covering-plate are all curved so as to be concave on the side toward the camera lens.

3. In a camera a focal-plane shutter as claimed in claim 1, wherein the covering-plate is provided with a plurality of positions of attachment so that during exposure a greater or less extent of the exposure-aperture in the shutter-plate is uncovered.

4. In a camera a focal-plane shutter as claimed in claim 1, wherein the setting means comprise a lever engaged with the covering-plate to move it back and forth, and the lever is provided with an abutment to engage a co-operating abutment on the shutter-plate so that when said abutments on the lever and shutter-plate are mutually engaged, the covering-plate is held with the exposure-aperture in the shutter-plate partly open, while when said abutments are disengaged the exposure-aperture is wholly open.

5. In a camera a focal-plane shutter as claimed in claim 1, wherein the exposure-apertures in the shutter-plate and the covering-plate are made of dimensions adequate to expose the whole area of the sensitive surface simultaneously and an additional time catch is provided which when operated holds up the shutter in a position where the sensitive surface is fully exposed.

6. In a camera a focal-plane shutter as claimed in claim 1, wherein the releasable-catch carries a flag-plate interposed between the shutter and the camera lens but moved out of the way by the catch when the catch is operated to release the shutter.

7. In a photographic camera having a focal plane shutter, the combination of a guide-plate with a picture-aperture therein, means to hold a light sensitive surface close against the back of the picture-aperture, a shutter-plate having an exposure aperture therein slidable in front of the guide-plate, a covering-plate slidable relatively to and close against the shutter-plate to cover the exposure aperture therein and means to move the covering- and shutter-plates together (with the exposure aperture closed) across the picture-aperture into a "set" position, to uncover the covering plate from the exposure-aperture and thereafter to return the plates together to make the exposure.

8. In a photographic camera having a focal-plane shutter the combination of a guide-plate with a picture-aperture therein, means to hold a light sensitive surface close against the back of the picture-aperture, a shutter-plate having an exposure-aperture therein slidable in front of the guide-plate, a covering plate slidable relatively to and close against the shutter-plate, means yieldingly to urge the covering plate into register with the exposure aperture in the shutter-plate, setting means to engage the covering plate and slide it to cover said exposure-aperture and thereafter to move said covering plate and shutter-plate simultaneously across said picture-aperture in the guide-plate to set position, means to hold said shutter-plate in set position while allowing said covering plate to move to uncover said exposure-aperture and means to release the shutter-plate so that it and the covering plate return together to make the exposure.

9. In a photographic camera, a combination as claimed in claim 7, wherein means are provided to limit more or less as the operator may determine the extent of uncovering movement of the covering plate, to vary the amount by which the exposure-aperture is uncovered and thus to regulate the effective time of exposure.

10. A photographic camera body having in combination two side-plates and a film guide-plate extending from one side-plate to the other to divide the film-holding portion of the camera-body from the lens and shutter, which guide-plate has a central exposure-aperture and is curved so as to be concave toward the lens, being close to the back of the camera at the exposure aperture and curving forward at its ends to embrace the film spools, to stiffen the connection of the side-plates, and to afford a curved guide for the film itself.

11. A photographic camera as claimed in claim 10, wherein the guide-plate serves also to support and guide on its concave face a curved shutter-plate of a focal plane shutter.

12. A photographic camera as claimed in claim 10 wherein the guide-plate serves also to support and guide on its concave face a curved shutter plate of a focal plane shutter and the side plates of the camera support inwardly projecting flanges parallel to the curved guide-plate and spaced therefrom by a sufficient distance to provide room for the edges of the curved shutter to slide so that the shutter is guided between the flanges and the curved guide-plate.

13. A photographic camera as claimed in claim 10, wherein a front-plate is provided to carry a lens mounting, which front-plate is curved in close contact with the ends of the curved guide-plate where they embrace the film spools and is held close against the same by flanges (27) projecting inwardly and supported by the side-plates.

ALFRED CROGER MAYO.